(12) United States Patent
Kim et al.

(10) Patent No.: US 8,335,676 B2
(45) Date of Patent: Dec. 18, 2012

(54) METHOD FOR CALCULATING FORCE ACTING ON INTERFACE BETWEEN IMMISCIBLE FLUIDS IN FLUID SIMULATION

(75) Inventors: Young Hee Kim, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 563 days.

(21) Appl. No.: 12/487,285

(22) Filed: Jun. 18, 2009

(65) Prior Publication Data

US 2010/0161298 A1 Jun. 24, 2010

(30) Foreign Application Priority Data

Dec. 22, 2008 (KR) .......................... 10-2008-0131367

(51) Int. Cl.
*G06G 7/50* (2006.01)
(52) U.S. Cl. ............................................................ 703/9
(58) Field of Classification Search .................... 703/9
See application file for complete search history.

(56) References Cited

U.S. PATENT DOCUMENTS 7,379,852 B2   5/2008   Freitas et al.

FOREIGN PATENT DOCUMENTS

| JP | 2008-152423 | 7/2008 |
| KR | 10-2005-0052707 | 6/2005 |

OTHER PUBLICATIONS

Muller et al. "Particle-Based Fluid Simulation for Interactive Applications" Eurographics/SIGGRAPH Symposium on Computer Animation (2003).*
Tartakovsky et al. "Pore Scale Modeling of Immiscible and Miscible Fluid Flows Using Smoothed Particle Hydrodynamics", ELSEVIER Jan. 2006.*
Morris, J. P., "Simulating surface tension with smoothed particle hydrodynamics", International Journal for Numerical Methods in Fluids, Jun. 15, 2000, vol. 33, issue 3, pp. 333-353.
Müller, M. et al., "Particle-based fluid simulation for interactive applications", Proceedings of the 2003 ACM SIGGRAPH/ Eurographics symposium on computer animation, Jul. 26-27, 2003, pp. 154-159.
Australian Office Action mailed Aug. 19, 2010 in corresponding Australian Patent Application 2009202402.
"Particle—Based Immiscible Fluid-Fluid Collision ", Hai Mao et al., Proceedings of the 2006 conference on Graphics interface, pp. 49-55, 2006.
"Particle—Based Fluid-Fluid Interaction ", Matthias Müller et al., Eurographics/ACM SIGGRAPH Symposium on Computer Animation, pp. 237-245, 2005.

* cited by examiner

*Primary Examiner* — Saif Alhija
(74) *Attorney, Agent, or Firm* — Staas & Halsey LLP

(57) ABSTRACT

A method for calculating a force acting on an interface between immiscible fluids in an SPH (Smoothed Particle Hydrodynamics) based fluid simulation includes: calculating a force caused by viscosities of the fluids; calculating a force caused by pressures of the fluids; calculating an external force applied to the fluids from outside; and calculating an interactive force caused by interaction between the fluids. The force acting on the interface between the immiscible fluids are obtained by using sum of the force caused by the viscosities, the force caused by the pressures, the external force and the interactive force. The interactive force is a surface tensional force calculated based on a pressure acting on the interface between the fluids.

7 Claims, 2 Drawing Sheets

METHOD FOR CALCULATING FORCE ACTING ON INTERFACE BETWEEN IMMISCIBLE FLUIDS IN FLUID SIMULATION

CROSS-REFERENCE(S) TO RELATED APPLICATION(S)

The present invention claims priority of Korean Patent Application No. 10-2008-0131367, filed on Dec. 22, 2008, which is incorporated herein by reference.

FIELD OF THE INVENTION

The present invention relates to a particle-based fluid simulation; and, more particularly, to a method for calculating a force acting on an interface between immiscible fluids in an SPH (Smoothed Particle Hydrodynamics) based fluid simulation.

BACKGROUND OF THE INVENTION

There are many methods relating to interaction between immiscible fluids in a smoothed particle hydrodynamics (hereinafter, simply referred to as "SPH") based fluid simulation. Particularly, there are two methods showing good visualization results in a graphics animation field: a first method using surface tension and a second method of changing velocities and positions of particles.

The first method uses property in which particles on a surface do not have a force maintaining balance with an inwardly acting force so that the particles on a surface are unstable than particles in the fluids and tend to form a sphere having the smallest surface. In this method, a force in proportion to magnitude of curvature acts in the normal direction of the particles. That is, the first method relates to a shape of a group of fluid particles.

However, in case of setting the surface tension to be weak in the first method, it is difficult to control mixing and scattering of the particles due to differences in velocities and pressures thereof occurring when the fluids collide. In case of setting the surface tension to be strong, the fluids shrink to overall form a sphere and stability of a system is damaged.

The second method of changing velocities and positions of particles detects collisions between the particles and changes the velocities and positions of the particles to prevent the particles from colliding with each other. This method shows a good result in simulating fluids which are not mingled with each other at all.

However, the collision detection as shown in FIG. 1A required to be performed in every simulation steps in the second method takes a considerably long calculation time. Further, in the second method, the collisions are prevented by instantly changing the calculated positions of the particles as shown in FIG. 1B to those as shown in FIG. 1C. However, distances between the particles are too short in FIG. 1C, which damages stability of a system in the next simulation step.

SUMMARY OF THE INVENTION

In view of the above, the present invention provides a method for calculating a force acting on an interface between immiscible fluids in an SPH based fluid simulation, which adds a surface tensional force based on a pressure acting as a major factor in scattering and mixing of the fluids during the collisions therebetween, thereby shortening calculation time and maintaining stability of a system.

In accordance with an aspect of the present invention, there is provided a method for calculating a force acting on an interface between immiscible fluids in an SPH (Smoothed Particle Hydrodynamics) based fluid simulation, the method including:

calculating a force caused by viscosities of the fluids;
calculating a force caused by pressures of the fluids;
calculating an external force applied to the fluids from outside; and
calculating an interactive force caused by interaction between the fluids, wherein the force acting on the interface between the immiscible fluids are obtained by using sum of the force caused by the viscosities, the force caused by the pressures, the external force and the interactive force.

Preferably, the interactive force is a surface tensional force calculated based on a pressure acting on the interface between the fluids.

Preferably, the interactive force is calculated by using parameters representing scattering properties of the fluids, normal vectors of particles in the fluids, a magnitude of the a force caused by the pressure acting on the interface between the fluids and an angle between a direction of the force caused by the pressure acting on the interface between the fluids and the interface of the fluids.

Preferably, the angle between the direction of the force caused by the pressure acting on the interface between the fluids and the interface of the fluids is calculated by using the normal vectors of the particles.

Preferably, the normal vectors of the particles are calculated by using variations of color fields assigned to the particles.

Preferably, each of the parameters representing the scattering properties has a value in a range from 0 to 0.5.

Preferably, a magnitude of the interactive force is determined by the magnitude of the force caused by the pressure acting on the interface between the fluids and a difference between the direction of the force caused by the pressure acting on the interface between the fluids and a direction of an average normal vector of the normal vectors of the particles.

In accordance with another aspect of the present invention, there is provided a computer-readable storage medium for storing therein computer-readable programs to execute on a computer the method of claim 1.

According to the present invention, only by adding to an SPH based fluid simulation an interactive force, calculated based on a pressure acting on an interface between fluids, acting on an interface between immiscible fluids, realistic and excellent visualization results can be obtained. The method of the present invention can be applied to an interaction between fluids following different fluid equations as well as fluids following identical fluid equations.

Further, since the interactive force can be calculated by using normal vectors of particles in the fluids and a magnitude of a force caused by a pressure acting on an interface between fluids only, simulation time for the fluid simulation can be shortened.

Furthermore, since the SPH based fluid simulation is used without changing a position and velocity of a specific particle, stability of a simulation system can be improved.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings, which form a part hereof.

Figure 1A:
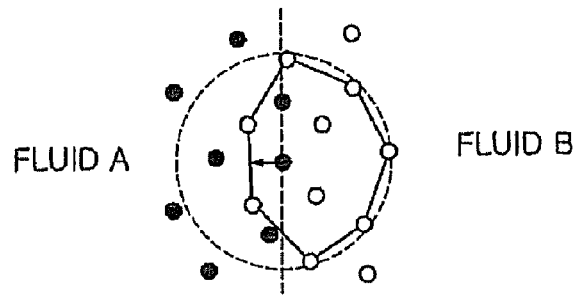
FIGS. 1A to 1C illustrate explanatory views of a conventional fluid simulation method.
Figure 1B:
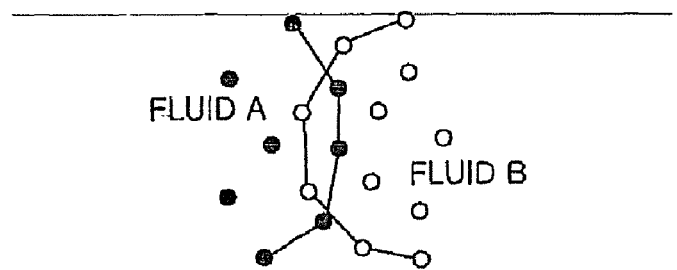
Figure 1C:
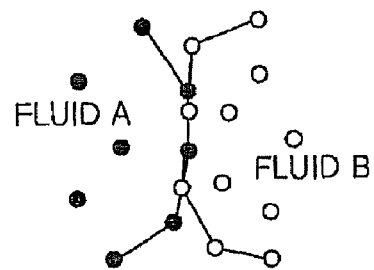
Figure 2:
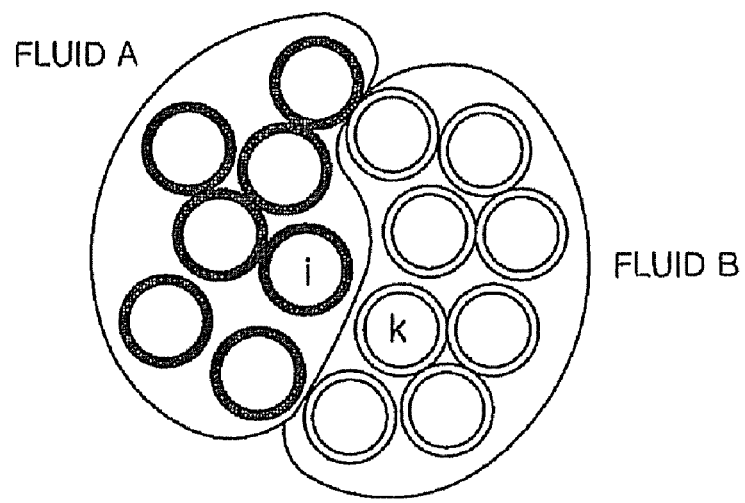
FIG. 2 illustrates a group of particles for explaining a method for calculating a force acting on an interface between immiscible fluids in a fluid simulation in accordance with the present invention.

FIG. 2 illustrates a group of particles for explaining a method for calculating a force acting on an interface between immiscible fluids in a fluid simulation in accordance with the present invention. Fluids A and B in FIG. 2 are immiscible fluids. The fluid A has a particle i and the fluid B has a particle k, respectively. Here, the first fluid A is assumed as a Newtonian fluid and the second fluid B is assumed as a non-Newtonian fluid, which means that the particles i and k belong to different particle systems.

In general, movement of a fluid is represented by a continuity equation and a momentum equation. The continuity equation and the momentum equation are as in Equation 1 and Equation 2, respectively:

$$\frac{D\rho}{Dt} = -\rho(\nabla \cdot V),  \quad \text{Equation 1}$$

$$\rho \frac{Dv}{Dt} = -\nabla P - [\nabla \cdot \tau] + \rho g, \quad \text{Equation 2}$$

wherein, V, ρ, P, g and τ respectively denote a velocity of a fluid, a density of the fluid, a pressure of the fluid, an external force acting on the fluid and a shear stress acting on the fluid.

Among the above-described two equations, the present invention relates to the momentum equation. Hereinafter, calculating forces acting on the particle i in the fluid A will be described. However, it should be noted that forces acting on the particle k in the fluid B can be calculated in a same manner as that for the particle i, except for features depending on the particle system to which it belongs.

From Equation 2, an acceleration $a_i$ varying a velocity of the particle i can be derived as in Equation 3:

$$a_i = \frac{Dv_i}{Dt} = \frac{1}{\rho_i}(-\nabla P_i - [\nabla \cdot \tau_i] + \rho g_i). \quad \text{Equation 3}$$

Assuming that the acceleration $a_i$ be a force $f_i$ acting on the particle i, the force $f_i$ includes three terms as in Equation 4:

$$f_i = a_i = \frac{1}{\rho_i}(f_i^{viscosity} + f_i^{pressure} + f_i^{external}). \quad \text{Equation 4}$$

In Equation 4, the term of $f_i^{viscosity}$ corresponds to the term of $-[\nabla \cdot \tau_i]$ in Equation 3, which is a force relating to a viscosity because a viscosity of the fluid A involves in calculating $\tau_i$. The term of $f_i^{pressure}$ corresponds to the term of $-\nabla P_i$ in Equation 3, which is a force related to the pressure. The term of $f_i^{external}$ corresponds to the term of $\rho g_i$ in Equation 3, which is a force applied from outside, e.g., the gravity.

Considering an interactive force acting on an interface between immiscible fluids A and B, the force $f_i$ can be rewritten as in Equation 5:

$$f_i = \frac{1}{\rho_i}(f_i^{viscosity} + f_i^{pressure} + f_i^{interface} + f_i^{external}), \quad \text{Equation 5}$$

wherein the newly added term of $f_i^{interface}$ is a surface tensional force interactively acting on the interface between the fluids A and B, i.e., the interactive force.

In Equation 5, the forces $f_i^{viscosity}$ and $f_i^{pressure}$ are as in Equations 6 and 7:

$$f_i^{viscosity} = \sum_k \left[\frac{V(i) + V(k)}{2}\right], \quad \text{Equation 6}$$

$$f_i^{pressure} = \sum_k \left[\frac{P(i) + P(k)}{2}\right], \quad \text{Equation 7}$$

wherein the terms of V(i) and V(k) in Equation 6 are forces respectively caused by viscosities of the fluids A and B, while the terms of P(i) and P(k) in Equation 7 are forces respectively caused by pressures of the fluids A and B. The forces V(i) and P(i) are calculated based on the particle system of fluid A, while the forces V(k) and P(k) are calculated based on the particle system of fluid B.

Figure 3:
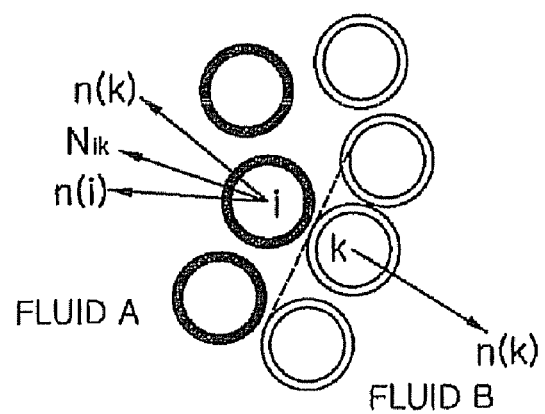
FIG. 3 illustrates an average normal vector of the particles in FIG. 2.

Referring back to Equation 5, the interactive force $f_i^{interface}$ can be calculated by using normal vectors of the particles i and k and an average normal vector of the particles i and k FIG. 3 illustrates a normal vector n(i) of the particle i, a normal vector n(k) of the particle k and an average normal vector $N_{ik}$ of the particles i and k. The average normal vector $N_{ik}$ determines the interface of the particles i and k. The interactive force $f_i^{interface}$ is as in Equation 8:

$$f_i^{interface} = \sum_k \left(\frac{a_i + a_k}{2}\right) \times (1 - \cos\theta_{ik}) \times |f_{ik}^{pressure}| \times \overline{N_{ik}}, \quad \text{Equation 8}$$

wherein the term of $\overline{N_{ik}}$ denotes a unit vector of the average normal vector $N_{ik}$, and the term of $f_{ik}^{pressure}$ denotes a force caused by a pressure acting on the interface between the fluids A and B. Further, the terms of $a_i$ and $a_k$ denote parameters depending on the respective particle systems of the fluids A and B, and represent immiscibility properties, i.e., degrees of being scattered (scattering properties), of the particles i and k, respectively. The term of $\theta_{ik}$ denotes an angle between the force $f_{ik}^{pressure}$ and the average normal vector $\overline{N_{ik}}$, i.e., an angle between the force $f_{ik}^{pressure}$ and the surface of the fluid A.

The normal vectors n(i) and n(k) can be easily obtained by assigning the particles i and k with respective color fields. For example, a color field having a value of one may be assigned to the particles of the fluid A and a color field having a value of zero may be assigned to the particles of the fluid B. Then, the normal vectors n(i) and n(k) can be obtained by calculating variations of the respective color fields, as in Equations 9 and 10:

$$n(i) = \nabla C_i, \quad \text{Equation 9}$$

$$n(k) = \nabla C_k, \quad \text{Equation 10}$$

wherein the terms of $C_i$ and $C_k$ are color fields assigned to the particles i and k, respectively.

Referring back to Equation 8, the term of $\cos\theta_{ik}$ is defined as in Equation 11:

$$\cos\theta_{ik} = \frac{f_{ik}^{pressure} \cdot \overline{N_{ik}}}{|f_{ik}^{pressure}|} \qquad \text{Equation 11}$$

As shown in Equations 8 and 11, a magnitude of the interactive force $f_i^{interface}$ depends on a difference between a direction of the force $f_k^{pressure}$ and a direction of the average normal vector $\overline{N_{ik}}$. If the two directions are identical, the term of $(1-\cos\theta ik)$ in Equation 8 becomes one so that the magnitude of the force $f_i^{interface}$ becomes zero. Accordingly, if the direction of the force $f_{ik}^{pressure}$ is identical to that of the average normal vector $\overline{N_{ik}}$, it is not necessary to apply an additional tension to stabilize the particles on the surface of the fluid A. If the direction of the force $f_{ik}^{pressure}$ is in reverse to that of the average normal vector $\overline{N_{ik}}$, the term of $(1-\cos\theta_{ik})$ in Equation 8 becomes two so that the magnitude of the force $f_i^{interface}$ becomes its maximum value.

As for the parameters $a_i$ and $a_k$ in Equation 8, since the forces $f_i^{interface}$ and $f_i^{pressure}$ need to meet a condition as defined in Equation 12 due to the angle between the force $f_i^{pressure}$ and the average normal vector $\overline{N_{ik}}$, the parameters $a_i$ and $a_k$ are set within a range from zero to 0.5:

$$|f_i^{interface}| \leq |f_i^{pressure}|. \qquad \text{Equation 12}$$

Particles on a surface of a fluid are more unstable than those in the fluid because they cannot maintain balance with inwardly acting forces. Such unstability increases in a simulation for an interaction between fluids following different fluid equations. This is because the particles on the surface are brought into contact with particles belonging to a different particle system which follows different fluid equations. Thus, when a pressure is applied to the immiscible fluids due to the collision, stronger attractions need to be applied to stabilize the particles on the surfaces. Accordingly, a major factor of the interactive force $f_i^{interface}$ in scattering and mixing of the fluids during the collision therebetween is a pressure acting on the interface between fluids, i.e., the force $f_{ik}^{pressure}$ in Equation 8.

In the present invention, instead of making the magnitude of the force $f_{ik}^{pressure}$ be in proportion to the magnitude of a curvature, the force $f_i^{interface}$ is adjusted according to the magnitude and direction of the force $f_{ik}^{pressure}$ as shown in Equation 8. Hence, the fluids can be prevented from being unrealistically scattered.

The method for calculating a force acting on an interface between immiscible fluids in an SPH based fluid simulation can be implemented by computer-readable codes stored in a computer-readable storage media. The computer-readable storage media may include all kind of storage media to which data read by a computer or the like is stored. The computer-readable storage media includes ROM, RAM, CD-ROM, a magnetic tape, a hard disk, a floppy disk, a flash memory, an optical data storage and a type implemented in the form of a carrier wave (e.g., transmission through internet). Moreover, the computer-readable storage media may be a distributed storage media distributed to computer systems interconnected to each other through a computer communications network, and the computer-readable codes are stored to be executed in the distributed storage media in a form of distributed codes.

While the invention has been shown and described with respect to the embodiments, it will be understood by those skilled in the art that various changes and modification may be made without departing from the scope of the invention as defined in the following claims.

What is claimed is:

1. A method for calculating a force acting on an interface between immiscible fluids in an SPH (Smoothed Particle Hydrodynamics) based fluid simulation, the method comprising:

calculating a force caused by viscosities of the fluids;

calculating a force caused by pressures of the fluids;

calculating an external force applied to the fluids from outside; and calculating an interactive force caused by interaction between the fluids, wherein the force acting on the interface between the immiscible fluids are obtained by a computer by using a sum of the force caused by the viscosities, the force caused by the pressures, the external force and the interactive force, wherein the interactive force is a surface tensional force calculated based on a pressure acting on the interface between the fluids at a contact surface of the fluids, and wherein the interactive force is calculated by using parameters representing scattering properties of the fluids, normal vectors of particles in the fluids, a magnitude of the force caused by the pressure acting on the interface between the fluids and an angle between a direction of the force caused by the pressure acting on the interface between the fluids and the interface of the fluids, wherein the interactive force is calculated by using the following formula:

$$\sum_k \left(\frac{a_i + a_k}{2}\right) \times (1 - \cos\theta_{ik}) \times |f_{ik}^{pressure}| \times \overline{N_{ik}},$$

wherein $N_{ik}$ denotes an average normal vector of particles of i and k; $\overline{N_{ik}}$ denotes a unit vector of $N^{ik}$; $f_{ik}^{pressure}$ the force caused by the pressure acting on the interface between the fluids; $a_i$ and $a_k$ denote the scattering properties of the particles of i and k, respectively; and $\theta_{ik}$ denotes the angle between the force $f_{ik}^{pressure}$ and the interface of the fluids.

2. The method of claim 1, wherein the angle between the direction of the force caused by the pressure acting on the interface between the fluids and the interface of the fluids is calculated by using the normal vectors of the particles.

3. The method of claim 1, wherein the normal vectors' of the particles are calculated by using variations of color fields assigned to the particles.

4. The method of claim 1, wherein each of the parameters representing the scattering properties has a value in a range from 0 to 0.5.

5. The method of claim 1, wherein a magnitude of the interactive force is determined by the magnitude of the force caused by the pressure acting on the interface between the fluids and a difference between the direction of the force caused by the pressure acting on the interface between the fluids and a direction of an average normal vector of the normal vectors of the particles.

6. A non-transitory computer-readable storage medium for storing therein computer-readable programs to execute on a computer the method of claim 1.

7. A method for calculating a force acting on an interface between immiscible fluids in an SPH (Smoothed Particle Hydrodynamics) based fluid simulation, the method comprising:
- calculating a force caused by viscosities of the fluids;
- calculating a force caused by pressures of the fluids;
- calculating an external force applied to the fluids from outside; and calculating an interactive force caused by interaction between the fluids,
- wherein the force acting on the interface between the immiscible fluids are obtained by a computer by using a sum of the force caused by the viscosities, the force caused by the pressures, the external force and the interactive force,
- wherein the interactive force is a surface tensional force calculated based on a pressure acting on the interface between the fluids, and
- wherein the interactive force is calculated by using parameters representing scattering properties of the fluids, normal vectors of particles in the fluids, a magnitude of the force caused by the pressure acting on the interface between the fluids and an angle between a direction of the force caused by the pressure acting on the interface between the fluids and the interface of the fluids,
- wherein the interactive force is calculated by using the following formula:

$$\sum_k \left(\frac{a_i + a_k}{2}\right) \times (1 - \cos\theta_{ik}) \times |f_{ik}^{pressure}| \times \overline{N_{ik}},$$

wherein $N_{ik}$ denotes an average normal vector of particles of i and k; $\overline{N_{ik}}$ denotes a unit vector of $N_{ik}$; $f_{ik}^{pressure}$ denotes the force caused by the pressure acting on the interface between the fluids; $a_i$ and $a_k$ denote the scattering properties of the particles of i and k, respectively; and $\theta_{ik}$ denotes the angle between the force $f_{ik}^{pressure}$ and the interface of the fluids.

* * * * *